United States Patent [19]

Stevens

[11] 4,006,288
[45] Feb. 1, 1977

[54] HIGH VOLTAGE SHIELDED CABLE TERMINATION, SPLICE CONNECTION, AND METHOD OF MAKING A SPLICE CONNECTION

[75] Inventor: David R. Stevens, Hackettstown, N.J.

[73] Assignee: Amerace Corporation, New York, N.Y.

[22] Filed: Dec. 5, 1975

[21] Appl. No.: 637,988

Related U.S. Application Data

[63] Continuation of Ser. No. 537,703, Dec. 30, 1974, abandoned.

[52] U.S. Cl. ............................... 174/73 R; 24/279; 29/628
[51] Int. Cl.² ................ H02G 15/02; H02G 15/08; H02G 1/14
[58] Field of Search ........... 174/73 R, 73 SC, 75 D; 339/59 R, 60 R, 60 C, 61 R, 112 R, 143 R, 143 C; 24/135 K, 279; 403/290, 309, 313, 344; 29/628; 156/49

[56] References Cited

UNITED STATES PATENTS

| 1,997,627 | 4/1935 | Casey | 174/73 R UX |
|---|---|---|---|
| 3,656,084 | 4/1972 | Malia | 174/73 R UX |
| 3,691,291 | 9/1972 | Taj | 174/73 R |
| 3,868,193 | 2/1975 | Schott | 403/344 |

FOREIGN PATENTS OR APPLICATIONS

600,189   6/1960   Canada ........................... 24/279

*Primary Examiner*—Laramie E. Askin
*Attorney, Agent, or Firm*—S. Michael Bender

[57] ABSTRACT

A connector construction having component parts adapted to be assembled in the field at the termini of a pair of high voltage shielded electrical cables includes a pair of sleeves of elastomeric material adapted to be secured over the insulating jacket on each of the cable ends, connector means for joining the conductive cores of the cables, a housing adapted to overlie the sleeves and the connector means and defining an interior chamber surrounding the connector means, and a pair of retaining members adapted to be directly affixed to each of the conductive cores respectively, in an abutting relation to the terminus of a corresponding sleeve and cable insulating jacket for precluding axial movement of the sleeve toward the cable termini.

9 Claims, 4 Drawing Figures

HIGH VOLTAGE SHIELDED CABLE TERMINATION, SPLICE CONNECTION, AND METHOD OF MAKING A SPLICE CONNECTION

This application is a continuation of application Ser. No. 537,703; filed Dec. 30, 1974, now abandoned.

BACKGROUND OF THE INVENTION

The present invention relates generally to electrical connectors and pertains, more specifically, to an electrical connector for providing a connection, in the field, between high voltage shielded electrical cables.

In recent years concern for maintaining the natural environment has caused electric utility companies to use underground installations instead of above ground high tension wires for power distribution. To facilitate the construction and installation of such underground power distribution systems it often becomes necessary to interconnect, in the field, the high voltage shielded electrical cables used in these installations. Various types of connectors have been developed for use in such systems, each attempting to reduce the number of components and the time required to make a satisfactory connection.

One such connector is described in U.S. Pat. No. 3,656,084 and includes an elastomeric housing slidably fitted over the joined ends of a pair of high voltage cables. This connector further includes a pair of so-called adaptor tubes or sleeves positioned respectively over the insulating jacket on each cable and received within the opposed end positions of the housing. The adaptor sleeves are used to accommodate varying insulation diameters thus permitting the connector to be used with varying sized cables utilizing a minimum number of component connector parts. The connector further includes a pair of rings affixed to the insulating jacket of the cable at the terminus of the insulating jacket for restraining the adaptor sleeves against slidable movement toward the cable ends when the elastomeric housing is slidably fitted thereover, and further includes a separate spring member in engagement between the crimp barrel joining the cable ends and the interior of the elastomeric housing for the purpose of conveying heat away from the crimp barrel into and through the elastomeric housing.

In an attempt to still further reduce the number of parts in such connectors, it has been proposed to threadedly mount the restraining rings on or near the opposed ends of the crimp barrel and utilize such rings for conveying heat away from the crimp barrel. An example of this connector arrangement is described in U.S. Pat. No. 3,691,291. However, even with the latter construction it has been found that when the barrel is joined to the two cable cores as by compression crimping, for example, it is possible to distort the screw threads on the ends of the barrel sufficient to prevent complete displacement of the threadedly mounted rings and produce a gap between the rings and the termini of the adaptor sleeves. This, in turn, permits undesirable movement of the adaptor sleeves toward the cable core termini.

In still another known connector arrangement as described for example, in U.S. Pat. No. 3,485,935, a pair of separate spring packets are disposed respectively on the cable cores between the insulating jackets thereof and the crimp barrel joining the cable cores and which packets might conceivably convey heat away from the juncture of the cable cores to and through the connector housing. However, such ability to transfer heat is limited by the springy nature of the packet and in any event, such means would be ineffective to sufficiently restrain axial movement of any adaptor sleeves used in conjunction with this form of connector.

SUMMARY OF THE INVENTION

Against the foregoing background, it is an object of the present invention to provide an improved high voltage splice connector for high voltage shielded electrical connectors.

Another object of the present invention is to provide an improved electrical connector with a minimum number of parts capable of ready assembly in the field to establish a reliable connection between high voltage shielded electrical cables.

A further object of the present invention is to provide an improved connector for high voltage shielded cables including means for efficiently conveying heat away from the junction of a plurality of joined cables and serving the dual function of restraining axial movement of any adaptor sleeves positioned over the insulating jacket of a particular cable toward said junction.

To the accomplishment of the foregoing objects and advantages, the present invention may be described briefly as providing an electrical connector having component parts capable of being assembled in the field at the termini of high voltage shielded electrical cables for providing a splice connection between such cables, such component parts comprising a housing having an inner bore, a plurality of adaptor sleeves, cable core connection means, and a plurality of retaining rings for precluding axial movement of each of the sleeves toward the cable termini, each of the retaining rings being adapted to be affixed directly onto one of the conductive cable cores in abutting relation with one of the sleeves and the terminus of a corresponding cable insulation jacket at a location on said conductive cable core between the terminus of the cable insulation jacket and the cable core connection means wherein the outer peripheral surface of the retaining ring engages the inner surface of a portion of the inner bore of the housing for providing a thermally conductive path extending between each of the conductive cores and the housing.

Still other objects and advantages of the present invention will be more apparent from a study of the following detailed description of the invention with reference to the accompanying drawing.

DESCRIPTION OF THE PREFERRED EMBODIMENT

Figure 1:
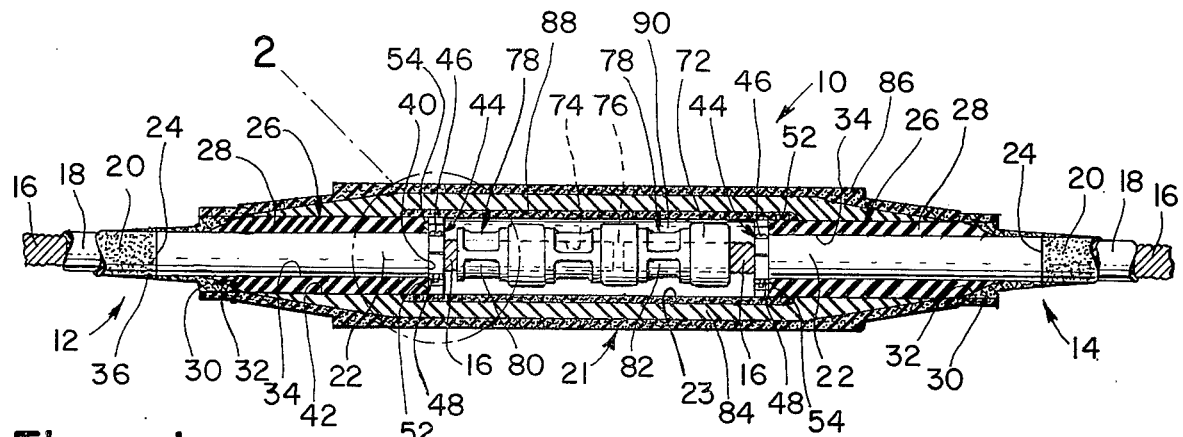
FIG. 1 is a longitudinal cross-sectional view of a fully assembled splice connector according to one preferred form of the present invention.
Figure 2:
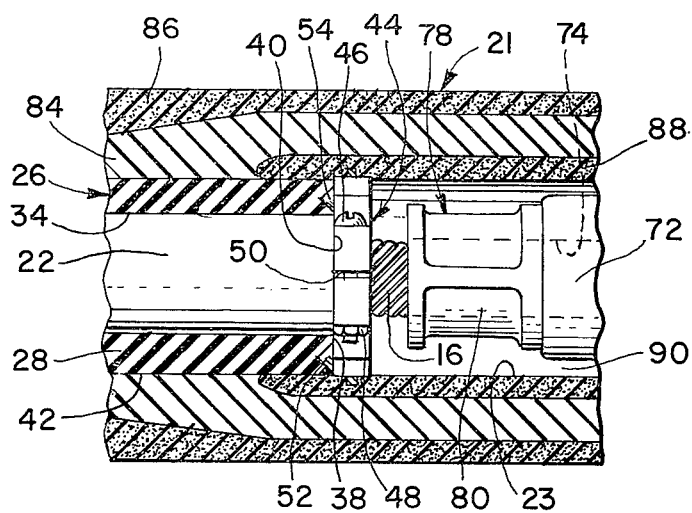
FIG. 2 is an enlarged fragmentary view in cross-section of the portion of FIG. 1 indicated by the broken circle in FIG. 1.

Referring now to the drawing, and initially to FIGS. 1 and 2 thereof, there is shown one preferred embodiment of the present invention in the form of a splice connector generally indicated by reference numeral 10. The splice connector 10 is of the type normally used to form a waterproof joint between a pair of high voltage shielded electrical cables 12 and 14 in an underground power distribution system. Each of the cables 12 and 14 has a centrally disposed, electrically conductive core 16 surrounded by an insulating jacket 18 which itself lies within an external conductive shield 20.

In order to effect a splice connection between the terminal ends of the cables 12, 14, the housing member 21 is slipped over the terminus of one of the cables, say cable 12, and is moved along the cable away from the terminus thereof. Such movement of the housing member 21 along the cable 12 is accomplished with little or no resistance since the housing member 21 is provided with an axially extending internal bore 23 having an internal diameter considerably larger than the overall external diameter of the cable. A portion of the conductive shield 20 is removed so as to expose a portion 22 of the insulating jacket 18 between each cable terminus and the termination 24 of the shield 20. A portion of the insulating jacket 18 is also removed from each of the cables 12 and 14 thereby exposing a portion of the electrically conductive cores 16.

A pair of adaptor sleeves 26 are then slipped over the terminal ends of each of the cables 12, 14 respectively, in a direction away from the terminus thereof and positioned on each cable substantially as shown in FIGS. 1 and 2, i.e., with one end 38 of the sleeve in alignment with the end 40 of the insulating jacket 18.

The adaptor sleeves 26 are preferably fabricated of an elastomeric material and include a first sleeve portion 28 of an electrically insulating elastomer, and a second sleeve portion 30 of an electrically conductive elastomer axially related to and integral with the first sleeve portion 28. The sleeve portions 28 and 30 are preferably molded together so that the sleeve portions are contiguous and joined together in a single assembly, the juncture 32 between the sleeve portions being continuous and void-free. Preferably, the compounds of the sleeve portions are based upon the same polymer to assure strong bonding. An ethylene-propylene terpolymer, available under DuPont's trademark NORDEL, is an example of a polymer which has been successfully used for this purpose. Insulating NORDEL is used for the first sleeve portion 28 and conductive NORDEL is used for the second sleeve portion 30. Alternatively, the second sleeve portion 30 may be in the form of a conductive coating, especially in locations of relatively thin cross-section, applied to the first sleeve portion 28. For the purposes of the instant description, the term "elastomer" is meant to include such coating.

Each adaptor sleeve 26 is provided with an internal bore 34 which extends axially from end 36 to end 38 of the sleeve 26 through both the first and second sleeve portions 28 and 30, the bore 34 being resiliently dilatable by virtue of the resilient nature of the elastomeric sleeve material permitting the sleeve 26 to overlap and snugly engage both the insulating jacket 18 and the conductive shield 20 on each cable 12, 14. Thus, the conductive portion 30 provided at the end 36 of sleeve 26 will be in intimate overlapping electrical engagement with the conductive shield 20 whereas the insulating portion 28 of sleeve 26 will merely be in intimate gripping contact with the exposed portion 22 of insulating jacket 18 when installed on the ends of the cables 12 and 14. In this regard, and as mentoned above, each of the cables is inserted into a corresponding sleeve 26 until the terminus or end 38 of the sleeve 26 is aligned substantially flush with the terminus or end 40 of the cable insulating jacket 18. It will be noted that each sleeve 26 has an external surface 42 common to both portions 28 and 30.

Once the adaptor sleeves 26 are in proper position upon their respective cables, a retainer shown in the form of a retaining collar or ring 44 is slipped over the terminus of each cable, urged into an abutting relationship with the flush ends 38 and 40 of each sleeve and insulating jacket, respectively, and affixed to the conductive core 16 of each cable, respectively (see FIG. 2).

Figure 3:
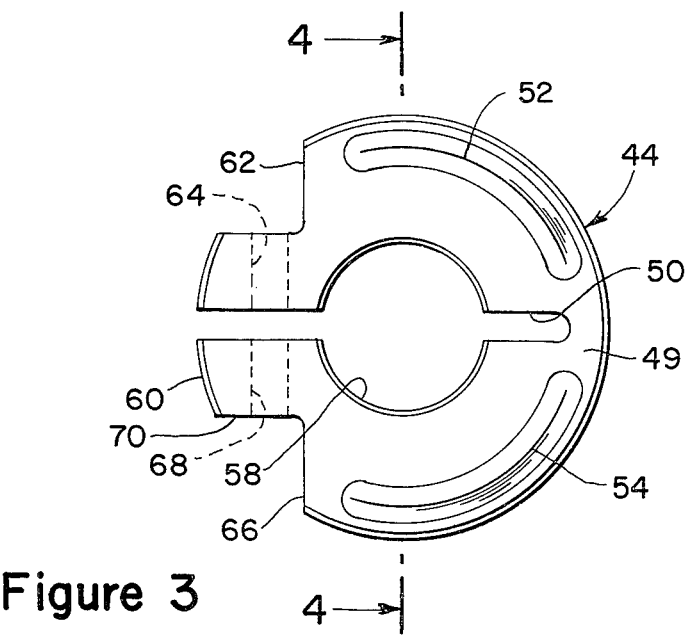
FIG. 3 is a front view in elevation of a preferred form of retaining means according to the present invention.

Each retaining ring 44 is preferably affixed to the core 16 by fastener means shown in the form of a conventional screw threaded bolt 46 which upon threaded engagement with cooperating nut 48 causes the upper portion of the ring 44 to flex slightly relative to the lower portion of the ring 44 about the narrow section 49 defined by the elongated slot 50 provided therein (see FIG. 3). Each sleeve 26 is thus positively held in engagement with its respective cable core 16 and retained against movement toward the cable terminus by the retaining ring 44. The retaining ring 44 is further provided with arcuate-shaped ridges 52 and 54 for protruding into and displacing a portion of the sleeve end 38 thus positively retaining the sleeve 26 in position and preventing the sleeve from sliding over the retaining ring during installation of the housing as will be explained hereinafter. The arcuate shaped ridges 52, 54 further improve the ability of the ring 44 to transfer heat from the core 16 through housing 21 via sleeve 26.

Figure 4:
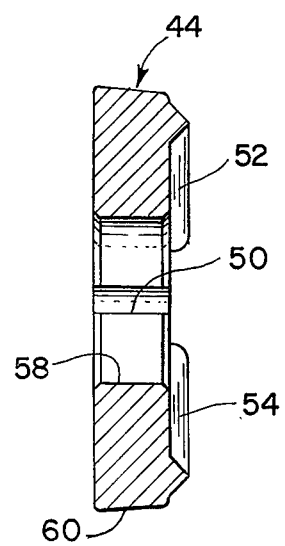
FIG. 4 is a cross-sectional view taken substantially along line 4—4 of FIG. 3.

With particular reference to FIGS. 3 and 4, each retaining ring 44 is preferably annular-shaped substantially as shown, and is fabricated from a material which is both a relatively good electrical and thermal conductor, such as for example, aluminum, copper, or brass. The retaining ring is also provided with a centrally disposed bore 58 which preferably has a diameter generally equal to the diameter of the cable conductive core 16. The aforementioned elongated slot 50 extends in a straight line from a portion of the outer peripheral edge 60 through the bore 58 terminating at a point proximate to but spaced inwardly from a diametrically opposed portion of the peripheral edge 60, thus providing the previously described flexure means in the form of reduced section 49. The reduced or necked-down section 49 enables the bore 50 to be increased and/or decreased thereby enabling the retainer ring 44 to be affixed to a cable core 16 despite dimensional tolerances between the diameter of the bore 58 and the diameter of the core 16. The arcuate-shaped ridges 52 and 54 are disposed proximate the peripheral edge 60 of the retaining ring 44 and function to retain the sleeves 26 in position, as noted above. The outer periphery 60 of the preferred embodiment of the retaining ring 44 is provided with a stepped portion 62 which, in turn, is provided with a through bore 64 extending toward and communicating with elongated slot 50, and is adapted to receive the screw threaded bolt 46 as shown most clearly in FIG. 2. A second stepped portion 66 is also provided in the outer periphery 60 of the retaining ring and includes a similar through bore 68 in alignment with through bore 64 and is also adapted to receive the screw threaded bolt 46. The second stepped portion 66 furthermore defines a bearing surface 70 for the nut 48 and is adapted to receive nut 48 without any portion thereof extending beyond the outer periphery 60 of the retaining ring 44. Threadedly engaging the screw threaded bolt 46 with the nut 48 after the screw threaded bolt has been inserted into bores 64 and 68 causes relative displacement of the upper and lower portions of the ring 44 as viewed in FIG. 3 and consequently, a decrease in the diameter of bore 58; thus, when the nut 48 is sufficiently tightened relative to screw threaded bolt 46, the retaining ring 44 will be positively and securely affixed to the conductive core 16 in the position shown, and a good electrical and thermal path between the core 16 and the housing 21 will be created.

It is contemplated that the retaining ring 44 will be manufactured by a conventional molding or die casting process. Thus, the periphery 60 thereof is provided with a slight slope to facilitate removal from the die or cavity of the mold.

Alternative means for affixing the retaining means onto the core 16, such as for example, by omitting the second stepped portion 66 from the retaining ring 44 and providing a threaded surface interiorly of through bore 68 so that the screw threaded bolt 46 may be threadedly engaged directly therein, that is, in the lower portion of the ring 44, to enable relative flexure of the upper and lower portions of the ring 44 and to firmly and positively secure the ring to the cable core 16, are considered within the contemplation of the present invention.

After securing the retaining rings 44 to the cable cores 16, the bared ends of the conductive cores 16 are then electrically connected together by means of an electrical connector element preferably in the form of the usual tubular metallic contact or connector 72 having a longitudinal aperture 74 divided by a transverse wall 76 to establish a pair of ferrules 78. Thus, each conductive core 16 is inserted into its respective ferrule 78 and the contact 72 is crimped in a conventional manner with a tool suited therefor (not shown) at 80 and 82 to affix the contact 72 to the conductors 16 in a well known manner. It will be appreciated that by virtue of the retainer rings 44 being mounted directly on the cable cores, other known forms of cable core connection means may be used with the present invention such as, welding, soldering, and so on.

It will be noted that the housing member 21 shown in FIGS. 1 and 2 comprises a composite construction fabricated of elastomeric material. The composite structure preferably includes a central portion 84 of an electrically insulating elastomer and outer and inner portions 86 and 88, respectively, of an electrically conductive elastomer. The central, outer and inner portions 84, 86 and 88, respectively, are preferably molded together, such as by molding the inner portion first, then molding the central portion around the inner portion and then molding the outer portion around the central portion to form the composite housing member, so that housing member 21 is an integral structure having contiguous inner and outer portions joined in a single assembly. The junctures between the inner, central and outer portions are continuous and void-free to enable electrical stresses to be kept within control along the length of the housing member 21. The housing member 21 is preferably fabricated of the same materials employed in the fabrication of the adaptor sleeves 26.

The relative dimensions of the central, outer, and inner portions 84, 86 and 88, respectively, are such that as the housing member 21 is moved from the cable 12 toward the cable terminus over the sleeves 26, metallic contact 72, and into position over cable 14 as shown in FIG. 1, the internal bore 23 of the housing is resiliently dilated to firmly grip the external surface 42 of each sleeve 26 in watertight relationship therewith and make electrical contact between the outer conducting portion 86 and the sleeve conducting portion 30. The central insulating portion 84 of the housing 21 makes contact with the sleeve insulating portion 28 of each sleeve 26 and the inner conducting portion 88 of the housing 21 makes electrical and thermal contact with the outer peripheral surfaces of the pair of retaining rings 44 thus maintaining a continuous thermal path from the conductive core 16 to the housing member 21 and providing an equipotential path or chamber 90 surrounding the air remaining between the cable conductive core 16, contact member 72, and the housing member 21. The continuous thermal path thus provided facilitates the conduction of heat generated at the cable termini across the gap between the connector 72 and the housing member 21, thereby increasing the effective capacity of the splice connection 10. At the same time, since the retaining ring 44 is electrically conductive, any deleterious voltage potential difference between the inner conducting portion 88 of the housing 21, the contact 72 and the conductive core 16 is eliminated.

Alternatively, the inner conducting portion 88 of the housing 21 may be provided by an additional tubular-shaped member, not shown, bridging the insulating jackets 18 of the cables 12 and 14 and in intimate electrical and thermal contact with the outer peripheries 60 of the retaining rings 44 as well as the inner bore 23 of the housing 21. While it is contemplated that the housing member 21 is to be fabricated in the form of a unitary housing, it has been found that a pair of complementary cooperating housing members as disclosed in the aforementioned U.S. Pat. No. 3,656,084 may be employed instead without departing from the invention.

The combination of the housing 21 with the corresponding adaptor sleeves 26 enables ready assembly in the field since the sleeves 26 are easily placed in proper position upon the cables by hand without damage to the cable and especially to the shield thereof. The greater forces needed to pull the housing 21 over the sleeves 26 are easily applied to the larger diameter housing member. The sleeves 26 being secured against movement in response to such pulling forces by virtue of the retaining rings 44 being affixed to the conductive cable core 16, can withstand such pulling forces and the pulling forces need not be applied to the more delicate conductive shield 20. In addition, as is well known in the art, cables of different diameters may be accommodated without changing the size or configuration of the housing 21 by merely providing adaptor sleeves 26 having internal bores of various diameters while maintaining the external surfaces 42 of the sleeves 26 at the same diameter.

It has been found that movement of the housing 21 to its proper position as shown in FIG. 1, may be facilitated by increasing the diameter or bore of the inner or central region of the conducting portion 88 relative to the housing bore 23 with the longitudinal dimension of such increased bore portion being substantially equal to the longitudinal dimension of the metallic contact 72 so as to extend substantially coextensive therewith when the housing 21 is located in the position shown in FIG. 1.

Although a preferred embodiment has been described above, it will be understood that many variations and modifications hereof may occur to those skilled in the art without departing from the principles of the present invention. For example, the present invention may be employed in making a connection between three high voltage shielded cables in a so-called T-splice by modification of the housing member and the metallic contact or connector member to permit three wires or cable cores to be joined together instead of two. Other modifications or variations will occur to those of ordinary skill in the art. Accordingly, it is desired that the subject invention be limited only by the spirit and scope of the appended claims.

I claim:

1. A splice connection between termini of first and second high voltage shielded electrical cables, said cables each having a conductive core surrounded by an insulating jacket within a conductive shield, the shield of each cable terminating short of the cable terminus to expose a portion of the insulating jacket between the terminus and the termination of the shield, and the insulating jacket terminating short of the cable terminus to expose the conductive core between the terminus and the termination of the insulating jacket, comprising:
   a. a pair of sleeves of elastomeric material, said sleeves each having a conducting portion and an insulating portion, one of said sleeves being secured on each of the cable ends respectively with said conducting portion of each sleeve overlapping the shield of the respective cable and being in electrical engagement with said shield and said insulating portion of each sleeve being in engagement with the insulating jacket of the respective cable;
   b. connector means joining the ends of said conductive cores together;
   c. a housing, said housing having an insulating portion and a conducting portion, said housing overlying said sleeves and said connector means with said conducting portion forming a conductive path bridging said conducting portions of said pair of sleeves, said housing insulating portion being in engagement with said insulating portion of each one of said pair of sleeves, and said housing defining a chamber surrounding the connector means; and
   d. a pair of retaining members for precluding axial movement of said sleeves toward the cable termini and for providing a thermally conductive path extending between each of said conductive cores and said housing, each of said retaining members being affixed directly onto one of said conductive cores and including means axially engaging both one of said sleeves and its corresponding insulating jacket.

2. The splice connection according to claim 1 wherein said housing further includes an inner conducting portion, said inner conducting portion engaging each of said retaining members to form a conductive path therebetween.

3. The splice connection according to claim 1 wherein each said retaining member comprises an annular-shaped ring having an arcuate-shaped ridge disposed on the side thereof abutting said one sleeve, said arcuate-shaped ridge engaging the annular end face of said one sleeve, said ring further including an arcuate surface disposed radially inwardly with respect to said ridge, said arcuate surface engaging the annular end face of said cable insulation.

4. The splice connection according to claim 3 wherein said ring includes a centrally disposed bore, said bore having a diameter substantially equal to the diameter of said conductive core, said ring including an elongated slot extending from a portion of the outer periphery thereof through said bore to a point proximate a diametrically opposed portion of said outer periphery for defining flexure means adjacent said opposed portion of said outer periphery whereby the diameter of said bore may be increased or decreased to receive differently sized conductive cores, and fastener means on said ring affixing said ring to a corresponding conductive core.

5. A termination of a high voltage cable having a conductive core surrounded by an insulating jacket within a conductive shield, wherein a portion of said conductive shield is removed to expose a portion of said insulating jacket and a portion of said insulating jacket is removed to expose a portion of said conductive core, comprising: a housing, an adaptor sleeve, and retaining means, said housing including a portion overlying the exposed portion of said conductive core and an insulating portion and a conducting portion, said adaptor sleeve having an insulating portion disposed in engagement with said housing insulating portion and said cable insulating jacket and having a conducting portion forming an electrical path between the conducting portion of said housing and said conductive cable shield, and said retaining means comprising an annular-shaped member directly affixed onto said conductive core and engaging said portion of said housing overlying said conductive core, said retaining means being disposed in mutual abutting relationship with the terminal end face of said cable insulating jacket and the terminal end face of said adaptor sleeve for precluding axial movement of said adaptor sleeve toward the terminus of said conductive core, said retaining means being adapted to provide a thermally conductive path between said conductive core and said housing.

6. A termination according to claim 5 wherein said annular-shaped retaining member includes an arcuate ridge proximate the outer periphery of said member, said arcuate ridge engaging the terminal end face of said sleeve, said annular-shaped retaining member further including an arcuate surface engaging the terminal end face of said cable insulation jacket, said arcuate surface being radially inwardly disposed relative to said arcuate ridge.

7. A termination according to claim 5 wherein said annular-shaped retaining member includes a centrally disposed bore having a diameter substantially equal to the diameter of said conductive core, and an elongated slot extending from one portion of the outer peripheral edge through said bore to a point proximate another diametrically opposed portion of the outer peripheral edge dividing said member into at least a pair of sections adapted to be flexed relative to each other, and means directly affixing said member to said conductive core.

8. A termination according to claim 7 wherein said means directly affixing said retaining means to said conductive core includes a first fastener element in one of said at least pair of sections, and a second fastener element in the other of said at least pair of sections, said second fastener element being adapted for cooperative engagement with said first fastener element.

9. The method of making electrical connection between termini of a pair of high voltage shielded electrical cables, with the aid of a kit of component parts capable of being assembled in the field of said cable termini, said cables each having a conductive core surrounded by an insulating jacket within a conductive shield, the shield of each cable terminating short of the cable terminus to expose a portion of the insulating jacket between the terminus and the termination of the shield, and the insulating jacket terminating short of the cable terminus to expose the conductive core between the terminus and the termination of the insulating jacket, said kit comprising a pair of sleeves of elastomeric material, said sleeves having a conducting portion and an insulating portion, one of said sleeves adapted to be secured on each of the cable ends with said conducting portion of each sleeve overlapping in electrical engagement with the shield of the respective cable and said insulating portion of each sleeve in engagement with the insulating jacket of the respective cable; connector means for joining the ends of said conductive cores together; a housing, said housing having an insulating portion and a conducting portion, said housing being adapted to overlie said sleeves and said connector means with said conducting portion forming a conductive path bridging said conducting portions of said pair of sleeves, said housing insulating portion being in engagement with said insulating portion of each of said pair of sleeves, and said housing defining a chamber surrounding the connector means; and a pair of retaining means for precluding axial movement of said sleeves towards the cable termini and for providing a thermally conductive path extending between each of said conductive cores and said housing, each of said retaining means being adapted to be affixed directly onto one of said conductive cores in axially engaging relation with both said one of said sleeves and its corresponding insulating jacket, said method comprising the following steps:

a. positioning said housing on one of said cables in displaced relation with respect to that cable's corresponding terminus;

b. securing each one of said pair of sleeves on a respective cable end with said conductive portion of each sleeve overlapping in electrical engagement the shield of the respective cable and said insulating portion of said sleeve in engagement with the insulating jacket of the respective cable and with the terminal end face of each said sleeve in substantial alignment with the terminal end face of the insulating jacket on each said cable end respectively;

c. affixing each one of said pair of retaining means directly onto a respective one of said conductive cores in axially engaging relation with both the terminal end face of a corresponding sleeve and the terminal end face of a corresponding insulating jacket of a corresponding cable;

d. joining the ends of said conductive cores together with said connector means; and e. displacing said housing in the direction of said connector means so as to slidably reposition said housing over said pair of sleeves, said pair of retaining means, and said connector means, and with the conductive portion of said housing forming a conductive bridge between the conductive portions on said pair of sleeves.

* * * * *